(12) United States Patent
De Graw et al.

(10) Patent No.: US 11,117,748 B1
(45) Date of Patent: Sep. 14, 2021

(54) GRAVITATIONALLY DIRECTED CONVEYOR MATERIAL CLEAT

(71) Applicants: Darren L De Graw, Farmington, UT (US); Chad Tyler Porter, Mountain Green, UT (US)

(72) Inventors: Darren L De Graw, Farmington, UT (US); Chad Tyler Porter, Mountain Green, UT (US)

(73) Assignee: CLEASBY LLC, San Francisco, CA (US)

( * ) Notice: Subject to any disclaimer, the term of this patent is extended or adjusted under 35 U.S.C. 154(b) by 0 days.

(21) Appl. No.: 17/135,326

(22) Filed: Dec. 28, 2020

(51) Int. Cl.
*B65G 17/16* (2006.01)
*B65G 15/58* (2006.01)
*B65G 15/44* (2006.01)

(52) U.S. Cl.
CPC ............ *B65G 17/16* (2013.01); *B65G 15/44* (2013.01); *B65G 15/58* (2013.01)

(58) Field of Classification Search
CPC ........ B65G 17/16; B65G 15/58; B65G 15/42; B65G 15/44; B65G 17/18
USPC .......................................................... 198/697
See application file for complete search history.

(56) References Cited

U.S. PATENT DOCUMENTS

| | | | | |
|---|---|---|---|---|
| 2,809,742 A * | 10/1957 | Holz | ...................... | A01D 61/00 198/697 |
| 3,534,848 A * | 10/1970 | Marks | .................... | B65G 19/26 198/697 |
| 3,633,723 A * | 1/1972 | Kosters | .................... | B41J 23/12 400/371 |
| 5,984,077 A | 11/1999 | Frye | | |
| 8,701,871 B2 * | 4/2014 | Fourney | ................. | B65G 17/46 198/779 |
| 8,944,236 B2 * | 2/2015 | Fourney | ................. | B65G 47/28 198/459.6 |
| 10,800,610 B1 * | 10/2020 | De Graw | ............... | B65G 15/42 |
| 2005/0103596 A1 * | 5/2005 | Crookston | ............. | B65G 21/14 198/312 |
| 2007/0145659 A1 * | 6/2007 | Kapturowski | ......... | B65G 17/26 270/52.1 |
| 2009/0050449 A1 * | 2/2009 | Boele | ..................... | B65G 17/48 198/735.2 |
| 2010/0200365 A1 * | 8/2010 | Pressler | ................. | B65G 47/28 198/460.1 |

FOREIGN PATENT DOCUMENTS

| | | | | |
|---|---|---|---|---|
| DE | 949038 C | * | 9/1956 | ............. B65G 17/18 |
| GB | 2515775 A | * | 1/2015 | ............. B65G 15/58 |

* cited by examiner

*Primary Examiner* — Mark A Deuble
(74) *Attorney, Agent, or Firm* — Cynthia Lamon; Lamon Patent Services

(57) ABSTRACT

A cleat for ferrying materials on a conveyor belt line includes a top portion having a height, a width, and an overall material thickness, a material interfacing side, and a lateral opening extending there through for accepting a pin axle. A bottom portion having a length, a width, and material thickness, and a vertically extending wall, the bottom portion supporting the pin axle in a fixed manner, and a counter weight encapsulated in, embedded in, or attached to a lower portion of the top portion on the gravity side of the pin axle opening. The cleat top portion rotating to an upright position on the top of the conveyor line and to a prone position on the bottom of the conveyor line.

10 Claims, 4 Drawing Sheets

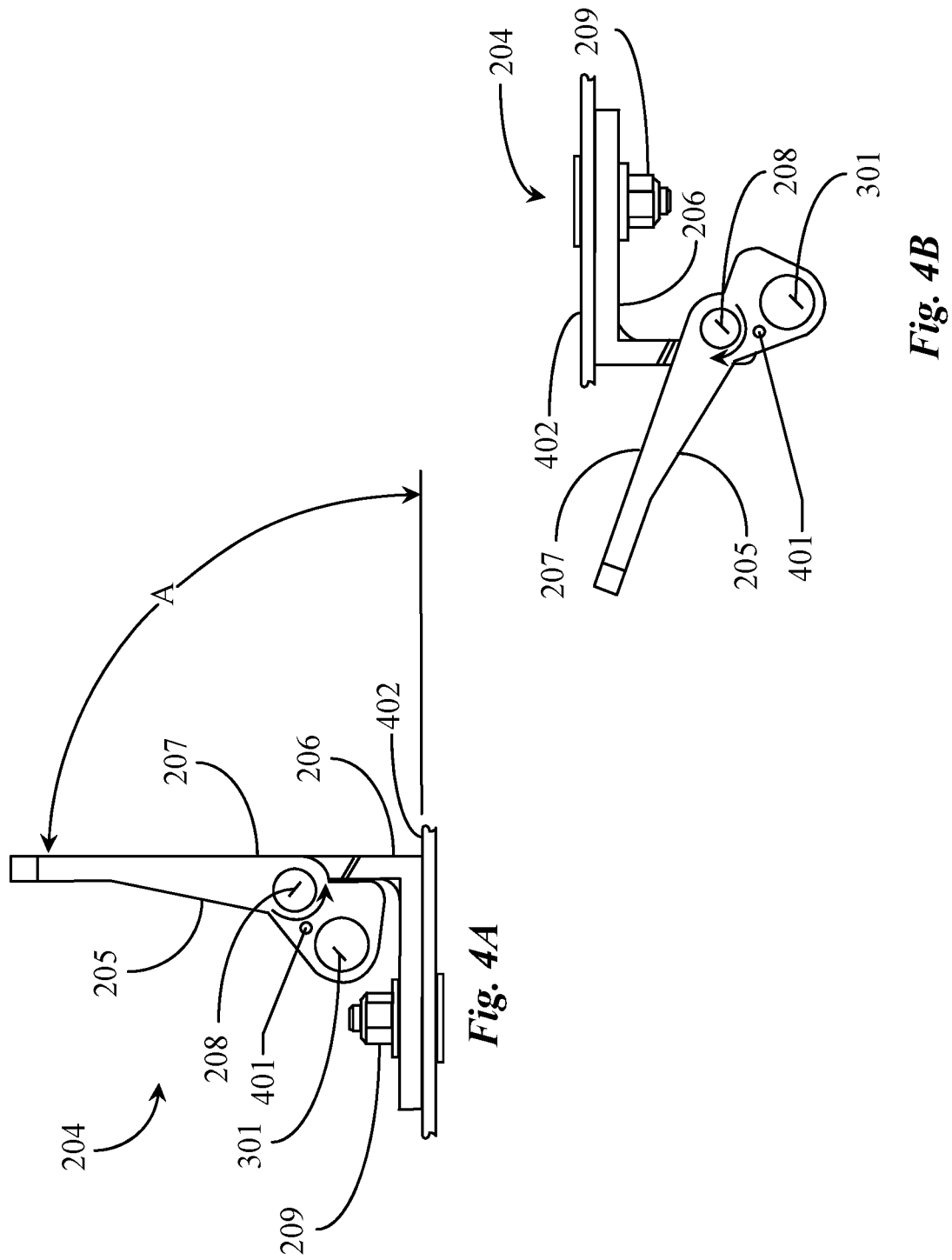

GRAVITATIONALLY DIRECTED CONVEYOR MATERIAL CLEAT

CROSS-REFERENCE TO RELATED DOCUMENTS

[NA]

BACKGROUND OF THE INVENTION

1. Field of the Invention

The present invention is in the field of construction equipment and pertains particularly to methods and apparatus for conveying materials onto and from a rooftop.

2. Discussion of the State of the Art

In the field of construction equipment, more particularly in the roofing industry, roofing materials have traditionally been carried or lifted onto a rooftop manually by the workers without any mechanical assistance. More recently, conveyor type systems including those that are hydraulically powered have been developed and used to convey heavy roofing materials such as roofing shingles for example from a ground location to the rooftop location where those materials will be applied in construction.

One such system is known to the inventor and is included herein at least by reference to U.S. Pat. No. 5,984,077 granted for a mobile overhead conveyor system. This system as known to the inventor may be referred to herein as Frye et al. The system of Frye et al is installed on a delivery truck that may deliver materials to a rooftop construction site. The system consists of a hydraulic rotary turret type base that supports, via a hydraulic lift mechanism or mechanisms, a boom structure housing a conveyor that can be operated under hydraulic power and positioned at an azimuth sufficient to convey roofing materials from the truck directly to a rooftop or from the rooftop back to the truck.

One component that is directly critical to moving materials up a conveyor are the material stops or material cleats as they are often referred to in the art. In a system known to the inventor and referenced herein, material cleats are fixed in an upright position to the conveyor belt in a same direction. In this system, the cleats are always vertical to ferry a material load staged for transport such as a bundle of roofing shingles, for example. The cleats are provided in pairs, spaced apart and facing toward the load which is loaded onto the conveyer from a material rest manifest at each side of the conveyer.

There are drawbacks to this system relative to height limitations for the cleats. The cleats are fixed single parts with no inflection or moving parts, so they reside in a vertical position against the conveyer belt throughout the journey around the conveyer belt. Therefore, the cleats must be held below a maximum height dimension of about three inches as measured from the belt surface to the top edge of the cleat. The limitation is required due to the fact that there is only enough clearance on the return side of the conveyor that runs through the housing and frame elements for a cleat no more than 3 inches in height.

The inventor is aware of a materials conveyor system that has a position-adjustable material conveyor cleat and apparatus for use in ferrying materials onto a rooftop. FIG. 1 of this specification depicts an isolated side-elevation view of the loading end of a conveyor with belt showing two rows of cleats 104, one row on top of the conveyor belt 101 in upright position and one row being erected to an upright position with pin ramp hardware comprised of twin erected flip ramp structures 103 mounted at both sides of the conveyor pulley 102.

The cleat (104) has a base portion 110 and a top portion 109 connected at a shared pin axle enabling the cleat to assume an upright position where required and a prone position where required. The top portion 109 of the cleat has a retention pin housing hosting a retention pin against a compression spring. The cleat assembly (104) includes a torsion spring installed over the pin axle, the torsion spring connected to the base portion 110, and to the top portion 109 the connection made under spring tension against the top portion. The spring tension from the torsion spring urges the top portion 109 to rotate about the pin axle and into a prone position by default, the material interfacing surface of the cleat lying substantially flush against the top surface of the conveyer belt 101.

The cleats are in a prone position when travailing under the conveyor boom and through the boom housing. However, the cleats are required to be erected back to a stable upright position before they fully round the loading end of the boom. In this case, additional hardware in the form of a pair of left and right-side flip ramps 103 must be mounted over the tail pulley 102 on the material loading side of the conveyor belt 101. The flip ramps are required to be strategically mounted in position and elevation to provide pin contact against curved bottom edges of the ramps as a means to drive the retention pins downward along the curves causing the top portions of each cleat in the pair of cleats to rotate about the pin axles to vertical positions against fixed tension in the torsion springs.

A downside to this approach is the complexity of the pin contact apparatus and meticulous positioning of the apparatus, as well as the fact that once the cleats in a pair leave the flip tracks they immediately spring back into the prone position so a load of material must be positioned to catch the material surfaces of the cleats while they are still being held vertical by ramps. When the material is removed at the top of the roof, the top portions of the cleats spring back down into a lower profile prone position desired when traveling underneath the boom.

Therefore, what is clearly needed is a gravitationally directed material conveyor cleat that solves the problems described above.

BRIEF SUMMARY OF THE INVENTION

According to an embodiment of the present invention, A cleat for ferrying materials on a conveyor belt line includes a top portion having a height, a width, and an overall material thickness, a material interfacing side, and a lateral opening extending there through for accepting a pin axle, a bottom portion having a length, a width, and material thickness, and a vertically extending wall, the bottom portion supporting the pin axle in a fixed manner, and a counter weight encapsulated in, embedded in, or attached to a lower portion of the top portion on the gravity side of the pin axle opening.

wherein the top portion is retained on and freely rotates about the pin axle in response to the angle assumed by the bottom portion, and wherein the top portion assumes an upright position, further rotation stopped by contact with the bottom portion on the top of the conveyor belt line, and wherein the top portion assumes a prone position, further rotation stopped by contact at the opposite end with the conveyor belt, on the bottom of the conveyor belt line, the counter weight and gravity driving the rotations about the pin axle.

In one embodiment, the overall material thickness is greatest at the lower portion of the top portion and the counterweight is a metallic dowel extending laterally through the top portion. In one embodiment, the height of the top portion including the height of the vertical wall of the bottom portion exceeds four inches in the upright position. In one embodiment, the bottom portion is bolted to the conveyor belt using nut and bolt hardware.

In a preferred embodiment, the material cleats on the conveyor belt line are arranged in pairs and are spaced apart in a line orthogonal to the conveyor belt line, the parings spaced apart linearly along the conveyor belt. In one embodiment, the inside diameter of the lateral opening in the top portion for accepting the pin axle is larger than the outside diameter of the pin axle to enable free rotation of the top portion about the pin axle.

In another embodiment, at least two bearing bushings are provided and spaced apart over the pin axle, the lateral opening adapted for containing the bushings over the pin axle and enabling free rotation of the top portion about the pin axle. In one embodiment, the prone position reduces the height profile of the upright position to approximately one-half distance. In one embodiment, the conveyor belt line occupies a conveyor boom adapted to ferry materials to and from a roof top. In a preferred embodiment, the vertical wall of the bottom portion lies in the same vertical plane as the material interfacing side of the top portion in the upright position on top of the conveyor belt line.

BRIEF DESCRIPTION OF THE SEVERAL VIEWS OF THE DRAWINGS

FIG. 4A is a side-elevation view of the gravitationally directed cleat of FIG. 3 in the upright position for ferrying materials.

FIG. 4B is a side-elevation view of the gravitationally directed cleat of FIG. 3 in the prone position for traveling through the conveyor housing.

DETAILED DESCRIPTION OF THE INVENTION

In various embodiments described in enabling detail herein, the inventor provides a unique system of material cleats that change position based on gravitational direction based on the angle of presentation on a material conveyor. A goal of the present invention is to provide a height-adjustable cleat for ferrying materials on a material conveyor system without requiring external contact against a portion of the cleat in order to adjust position between upright and prone. The present invention is described using the following examples, which may describe more than one relevant embodiment falling within the scope of the invention.

Figure 1:
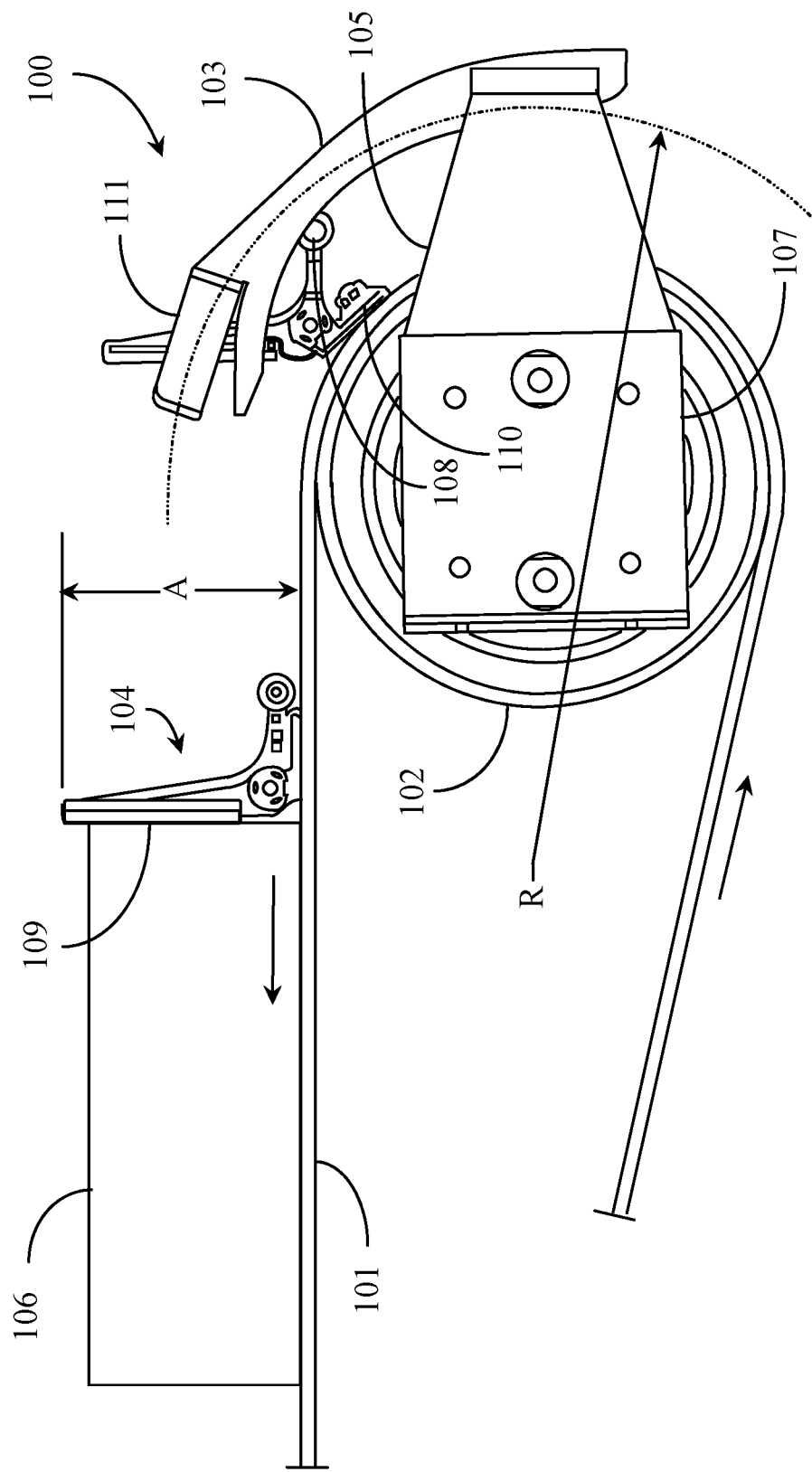
FIG. 1 is a partial side-elevation view of a material conveyor with position-adjustable material cleats according to current art.

FIG. 1 is a partial side-elevation view of a material conveyor 100 with position-adjustable material cleats according to current art. Material conveyer 100 is depicted in this partial view in the portion of the tail pulley end of conveyer 100. Tail pulley 102 supports a conveyer belt 101. In this view, the forward direction of belt 101 is indicated by directional arrows and is counterclockwise in this view of the left side of the conveyer from the perspective of the viewer.

Material cleats 104 are provided in spaced apart pairs wherein each pair is also spaced apart from adjacent pairs along the length of conveyer belt 101. Material cleat 104 is a position adjustable cleat with respect to its vertical profile when carrying material to a prone position wherein the cleat lies face down against conveyer belt 101. Cleats 104 are installed to conveyer belt 101 using bolt and nut hardware. Cleat 104 includes a top material interface plate 109 and a bottom base component 110. The top portion of cleat 109 includes a pin housing that accepts a spring-loaded steel pin 108. Top portion 109 of cleat 104 is designed to rotate about an axle adapted to connect the top portion 109 and base portion 110 such that top portion 109 may be urged into a vertical profile position on the material ferry side of conveyer 100 or be allowed to retain a prone position against belt 101 on the belt-return side of the conveyer with the material interfacing surface of top portion 109 lying face down against the belt.

Position adjustable material cleat 104 is spring tensioned to remain in a prone position against belt 101 as described above. A torsion spring assembly is provided connecting the base portion 110 to a pin axle supporting the top material interface portion 109 of cleat 104. A material load 106 is depicted flush against material cleat 104 in a vertical position thus preventing cleat 104 from assuming a prone position. Cleat 104 is urged into a vertical or upright position to move materials via a flip ramp apparatus 103 that functions to lift cleat 104 at the start of the material catch zone on the carry side of belt 101. The base section 110 is made largely non-conductive materials such as nylon. The top portion section of cleat 105 has an axial connection to the base section with a pin and cotter. The middle section, which includes top portion 109, is made largely of non-conductive materials such as nylon. Metallic components may include pins springs and installation bolts and nuts. Metallic components may be selected from metals having higher resistance characteristics to conduction of electricity.

Cleat 104 has an overall vertical height dimension A when in vertical profile and carrying material. Dimension A may be about four and three sixteenth inches in height. Dimension A is enabled only on the carry side of conveyer belt 101. When material load 106 is removed from belt 101 such as on a rooftop, material cleat 104 springs immediately downward and assumes a prone position with the material interfacing surface 109 flush against the belt. Height profile A is taller than the height profiles of fixed material cleats previously known to the inventor. In prone position, a pin housing encasing a spring-loaded pin 108 assumes a vertical position on conveyer belt 101 at a height of only about two inches. Therefore, cleat 104 must remain in prone position on the return side of conveyer belt 101 to avoid contact with framing elements and other hardware components or elements.

As described in the background section of this specification, a flip ramp bar 103 (pair of bars) representing additional hardware must be provided and mounted via a bracket 105 to a belt slack take in plate 107 at pulley component 102. Material cleat 104 is urged from a prone position coming into the tail pulley section from the return side of conveyer belt 101 into a vertical position for ferrying materials by contact made against pin 108 at the lower curved edge of flip ramp 103 while belt 101 is driven forward. Material cleat is flipped up completely before emerging from flip ramp 103 and just before contacting material load 106.

The material load is pushed off of a material loading ramp (not illustrated) strategically located at the top side of the conveyer and must be in place on the conveyor to prevent the cleats from going back into a prone position presenting a potential for error. In addition to the hardware in the form of flip ramps, a retainer pin, retainer in housing, and torsion spring must be provided in each cleat for contacting the flip ramps. In addition to added hardware both on the conveyor structure and on the cleat, the system described above must be meticulously aligned to relative tight tolerances to ensure proper contact between oncoming cleats and the curved flip ramps.

Figure 2:
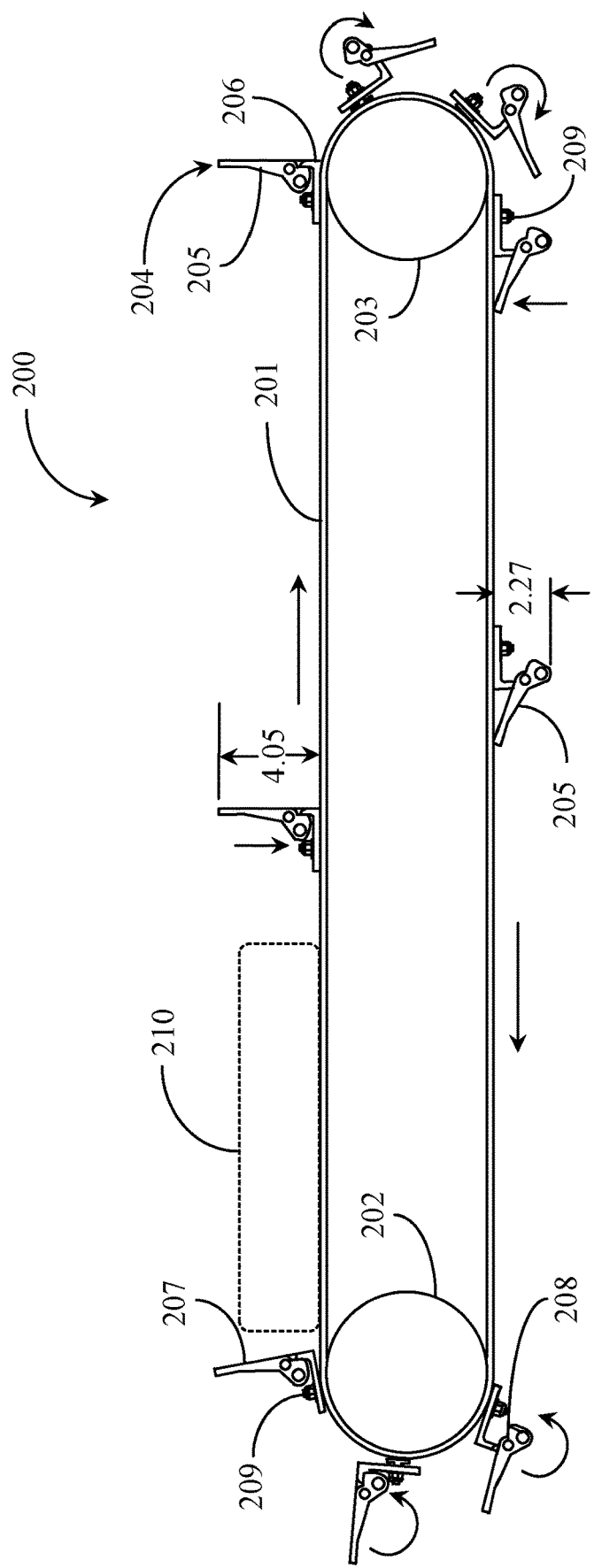
FIG. 2 is a side-elevation view of a material conveyor with gravitationally directed cleats according to an embodiment of the present invention.

FIG. 2 is a side-elevation view of a material conveyor 200 with gravitationally directed cleats according to an embodiment of the present invention. Material conveyor 200 represents a material conveyor like conveyor 100 of the prior art except that the flip ramp structures are not required because of a new and unique cleat design in gravitationally directed material cleats 204. Material cleats 204 are provided along the conveyor line in pairs spaced apart from one another and aligned along the orthogonal axis to the linear conveyor belt 201.

In this view, conveyor belt 201 moves in the direction of the straight directional arrows over pulleys 202 and 203. Pulley 202 is located at the material loading end while pulley 203 is where the material is unloaded onto a roof top. Material cleats 204 may be bolted to the conveyor belt in respective positions using nut and bolt hardware 209. A material cleat 204 includes a top portion 205 and a bottom portion 206 manufactured for connection over a pin axle 208. Bottom portion of cleat 204 is the fixed element of cleat 204 whereas the top portion of the cleat for ferrying the material is allowed to freely rotate about pin axle 208.

Top portion 205 of material cleat 204 includes a long flat plate side on one side of pin axle 208 including material interface surface 207, and a squat body portion on the belt-side of the pin axle 208. In a preferred embodiment, a counterweight is provided to be embedded in or otherwise attached to the squat body portion of top portion 205 of cleat 204. In this side view, the larger circular feature in the squat body portion of cleat top portion 205 may represent a counterweight like a heavy dowel pin. A material load 210 is depicted in position (broken boundary) to be ferried up the conveyor to a roof top from a material loading zone.

Material cleat 204 is controlled gravitationally to switch between a prone position and an upright position based on the angular position of the lower cleat portion 206 on the conveyor belt. Cleat 204 is maintained by gravity in the upright position while the cleat is on the top side of the conveyor 200. Cleat 204 is forced into a prone position gravitationally, while the cleat is on the bottom side of conveyor 200.

Gravitationally directed material cleat 204 is approximately four inches high in the upright position on top of conveyor 200. Cleat 204 has a total height profile of about two and one quarter inches in the prone position on the bottom of conveyor 200. In the upright position, the counter weight embedded into or otherwise affixed to at the squat body side of pin axle 208 referencing the top portion 205 of cleat 204, is directed down by gravity wherein the squat body end of the top portion of the cleat is seated against the fixed bottom portion 206 of the cleat prevention rotation beyond the ninety degree presentation of the material interface 207 of the cleat relative to the line of the conveyor 201.

When cleat 204 travels past the material unloading end of the conveyor at pulley 203, gravity unseats the counter-weighted portion of part 205 and portion 205 rotates clockwise in this view according to the direction of the circular arrows about pin axle 208 until the cleat is entering the bottom side of the conveyor housing wherein the extended tip of the top portion abuts against the conveyor belt stopping further rotation. The material of the cleat may be a lightweight material like a nylon material wherein the counterweight may be a heavy metal dowel that may be encapsulated in one embodiment, within the nylon material and therefore insulated against electric conductance.

As the material cleat travels in the prone position along the conveyor line in the prone position and passes the vertical center line of pulley 202, the counter-weighted squat body is directed over the course of traveling about the pulley back into the seated upright position before the material loading section referenced by material load 210. In this embodiment, each cleat 204 is gravity-directed to switch from prone position to upright position and back to prone position. This enables a third or center cleat to be installed between the right and left cleat.

The prior art system described in FIG. 1 is limited to a right cleat and a left cleat because of the required hardware to flip those cleats. It is also noted herein that gravitationally directed material cleats 204 do not depend on contact with a material load to remain upright while on top of the conveyor. Therefore, if a load is missed, the conveyor may be reversed to enable a correction without manually raising the cleats against a spring tension.

Figure 3:
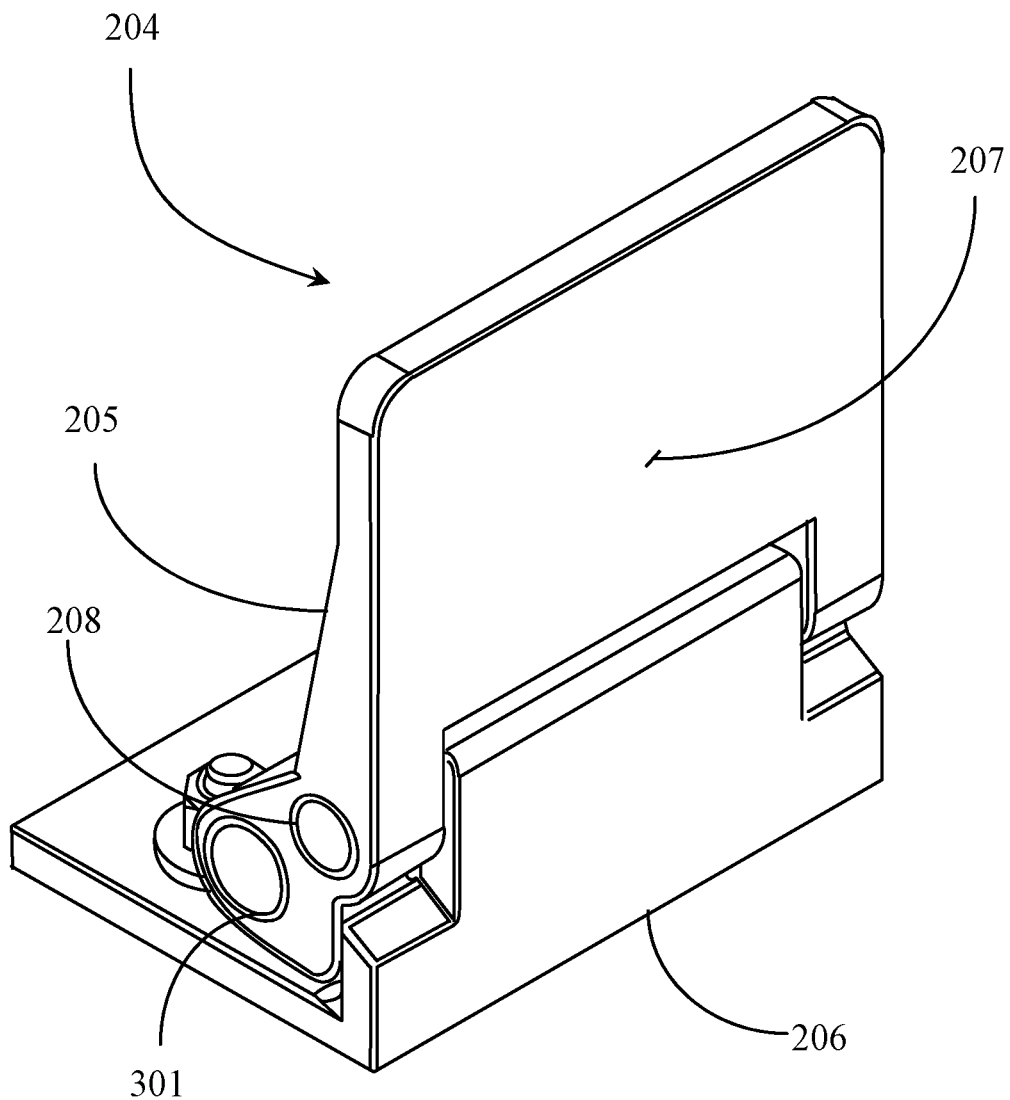
FIG. 3 is a perspective view of a gravitationally directed cleat of FIG. 2.

FIG. 3 is a perspective view of a gravitationally directed cleat 204 of FIG. 2. The top portion 205 of material cleat 204 may be rotated an approximate total of one-hundred ten to fifteen degrees about pin axle 208 before being prevented from further rotation by bottom portion 206 seating the counter weighted squat body (upright position) or the conveyor belt surface (prone position). Top portion 205 of cleat 204 has a center of mass point generally disposed between the embedded counterweight referenced herein as counterweight 301, and pin axle 208 (fulcrum point). Therefore, the center of mass point is on the gravity side of the pin axle. The only moving part of material cleat 204 is the top portion 205 that interfaces a material load in the upright position via interfacing surface 207.

In one embodiment, top portion 205 may be adapted to accept at least two bearing bushings that may fit over pin axle 208 enabling free rotation of the top portion about the pin axle via the spaced apart bushings. Top portion 205 may be adapted for bushings by providing concentric bushing seats in line with the pin axle wherein the bushings may be snapped into or press fit into the top portion 205 at either side of the part.

Bottom portion 206 forms a bottom plate and a vertical plate that has a height dimension sufficient to stop rotation of the top portion by seating the squat body portion hosting counterweight 301. In the upright position, material interface 207 is brought substantially flush with and in the same plane as the material facing side of bottom portion 206.

FIG. 4A is a side-elevation view of a gravitationally directed cleat 204 of FIG. 3 in the upright position for ferrying materials. Gravitationally directed material cleat 204 is depicted in a full upright position referenced herein by angle A approximately ninety degrees from belt. In the full upright position, top portion 205 is stopped from further rotation in the direction of the arrow beyond 90 degrees (A)

by contact with bottom portion 206. A center of mass point 401 resides on the far side of pin axle 208 from the top extended edge of top portion 205. Counterweight 301 may be any heavy material that may be encapsulated by, embedded within, or otherwise attached to the bottom squat body portion of top portion 205 of cleat 204.

FIG. 4B is a side-elevation view of the gravitationally directed cleat 204 of FIG. 3 in the prone position for traveling through the conveyor housing. Gravitationally directed material cleat 204 is depicted in a complete prone position. The top portion 205 rotates away from the bottom portion 206 of cleat 204 when the bottom portion of the assembly is upside down. In this position, contact between the top surface of piece 205 and belt 402 prevent further rotation in the direction of the arrow. Gravity on the counterweight pulls the counterweight down and out of its stop interface with bottom portion 206 of cleat 204.

It will be apparent with skill in the art that the gravitationally directed material cleat of the present invention may be provided using some or all the elements described herein. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A cleat for ferrying materials on a conveyor belt line comprising:
   a top portion having a height, a width, and an overall material thickness, a material interfacing side, and a lateral opening extending there through for accepting a pin axle;
   a bottom portion having a length, a width, and material thickness, and a vertically extending wall, the bottom portion supporting the pin axle in a fixed manner; and
   a counterweight encapsulated in, embedded in, or attached to a lower portion of the top portion on the gravity side of the pin axle opening;
   wherein the top portion is retained on and freely rotates about the pin axle in response to the angle assumed by the bottom portion, and wherein the top portion assumes an upright position, further rotation stopped by contact with the bottom portion on the top of the conveyor belt line, and wherein the top portion assumes a prone position, further rotation stopped by contact at the opposite end with the conveyor belt, on the bottom of the conveyor belt line, the counter weight and gravity driving the rotations about the pin axle.

2. The cleat of claim 1, wherein the overall material thickness is greatest at the lower portion of the top portion, and the counterweight is a metallic dowel extending laterally through the top portion.

3. The material cleat of claim 1, wherein the height of the top portion including the height of the vertical wall of the bottom portion exceeds four inches in the upright position.

4. The material cleat of claim 1, wherein the bottom portion is bolted to the conveyor belt using nut and bolt hardware.

5. The material cleat of claim 1, arranged in pairs spaced apart in a line orthogonal to the conveyor belt line, the parings spaced apart linearly along the conveyor belt.

6. The material cleat of claim 1, wherein the inside diameter of the lateral opening in the top portion for accepting the pin axle is larger than the outside diameter of the pin axle to enable free rotation of the top portion about the pin axle.

7. The material cleat of claim 1, wherein at least two bearing bushings are provided and spaced apart over the pin axle, the lateral opening adapted for containing the bushings over the pin axle and enabling free rotation of the top portion about the pin axle.

8. The material cleat of claim 1, wherein the prone position reduces the height profile of the upright position to approximately one-half distance.

9. The material cleat of claim 1, wherein the conveyor belt line occupies a conveyor boom adapted to ferry materials to and from a roof top.

10. The material cleat of claim 1, wherein the vertical wall of the bottom portion lies in the same vertical plane as the material interfacing side of the top portion in the upright position on top of the conveyor belt line.

* * * * *